April 15, 1941. J. H. MILLER 2,238,745
CRUMB SCRAPER
Filed Aug. 7, 1939

Inventor
JOHN HENRY MILLER.
By Howard J. Whelan.
Attorney

Patented Apr. 15, 1941

2,238,745

UNITED STATES PATENT OFFICE 2,238,745

CRUMB SCRAPER

John Henry Miller, Baltimore, Md.

Application August 7, 1939, Serial No. 288,868

2 Claims. (Cl. 65—12)

This invention refers to cutlery and more particularly to a scraper for lifting incidental crumbs off dining tables after a repast, and has among its objects to provide a scraper of this type that will be compact and capable of being made up in an attractive form of more expensive materials than conventional, without making the cost of production high enough to be appreciably objectionable. Another object is to have a scraper of this nature that may be carried very conveniently in the pocket and be held securely thereto, and at the same time avoid being unattractive. A further object is to avoid the use of cumbersome handles for its use and operation; to have it particularly efficient in lifting up crumbs and retaining same in the scraper; and to have it capable of being used with one hand and adaptable to considerable manipulation in and around articles without inconveniencing persons sitting at the table, or endangering the condition of the articles.

Other objects will become apparent as the invention is more fully set forth.

The use of the conventional brush and crumb pan is cumbercome, and usually disturbs the diners at the table in its use, because of the relatively large area of operation required by them. The user requires one hand for the pan, and the other for the brush, and in doing so has to get close to the table, bend over same, and move the persons at the table sufficiently to give him ample access thereto. The crumbs have to be brought to the side of the table so the pan may be tipped up to take them. The straightness of the pan prevents the crumbs staying on the pan by themselves. When the implements are put away, they require a special table or shelf for the purpose, and of appreciable size. The thin metal pan form of the crumb pan and the scattering by the brush, makes their use objectionable.

In this invention, the scraper functions as brush and pan in itself. It consist of a simple narrow piece of transversely curved strip of metal, plastic, or the like, bent on a segment of a circle of about 120 degrees. The edges are preferably bevelled but not to a cutting edge. The end portions are rounded as indicated, to provide a sidewise scraper and to enable the crumbs to be dumped readily without spilling. A side piece is arranged on it to give more hold on the scraper than the article itself provides, and may be pushed out of the way or used to hold the scraper in the pocket of the owner, after the conventional method used for fountain pens and the like. The scraper has the feature of being able to retain the crumbs as soon as they are pushed on it, by reason of its curved surface. It requires the use of only one hand, or in fact, only two fingers, and is therefore, very convenient and compact, and can go in and out among the articles on the table, with ease and expedition.

It is light, by reason of being so small comparatively, and does not encumber the pocket noticeably. It makes use of the new principle in crumb scrapers that involves the use of a small section of cylinder instead of a flat pan, with handle and other details. It is efficient because it holds the crumbs as soon as they are scraped in, which the flat pans do not do, and for its small size takes and holds crumbs in a considerable amount. It does not require a brush or any auxiliary implements, and its construction is so simple as to require little effort in keeping same clean. It is strong and will not dent when dropped, and does not have the thin, weak, and unattractive appearance of the usual type of pan. In fact, the latter always give the impression of floor sweeping and dust pan combination, used on a table. It affects the appetite and convenience of the diners, and by reason of the difficulty of keeping the crumbs on the pan, raises objectionable features, which only custom prevents protesting against.

This invention, with its artistic, inconspicuous, and fast moving construction, not only avoids these objections, but adds interest to its operation.

The scraper can be adjusted to many angles to suit the work done by it, and enables the user to reach over to the middle of the table and manipulate it, just as effectively as at any other portion. In other words, the scraper can pick up crumbs in any part of the table with facility and convenience, requiring the use of only one arm and hand to place it at the desired spots. The transverse curve of the scraper permits this, as well as serving as a retaining reservoir for the collection of crumbs and particles. The curved construction substantially stiffens the article and makes it capable of withstanding hard usage and wear, as well as adding to its general appearance.

In the drawing which illustrates an example of this invention:

Similar reference characters refer to similar parts throughout the drawing.

Figures 1, 2, 3, 4, 5:
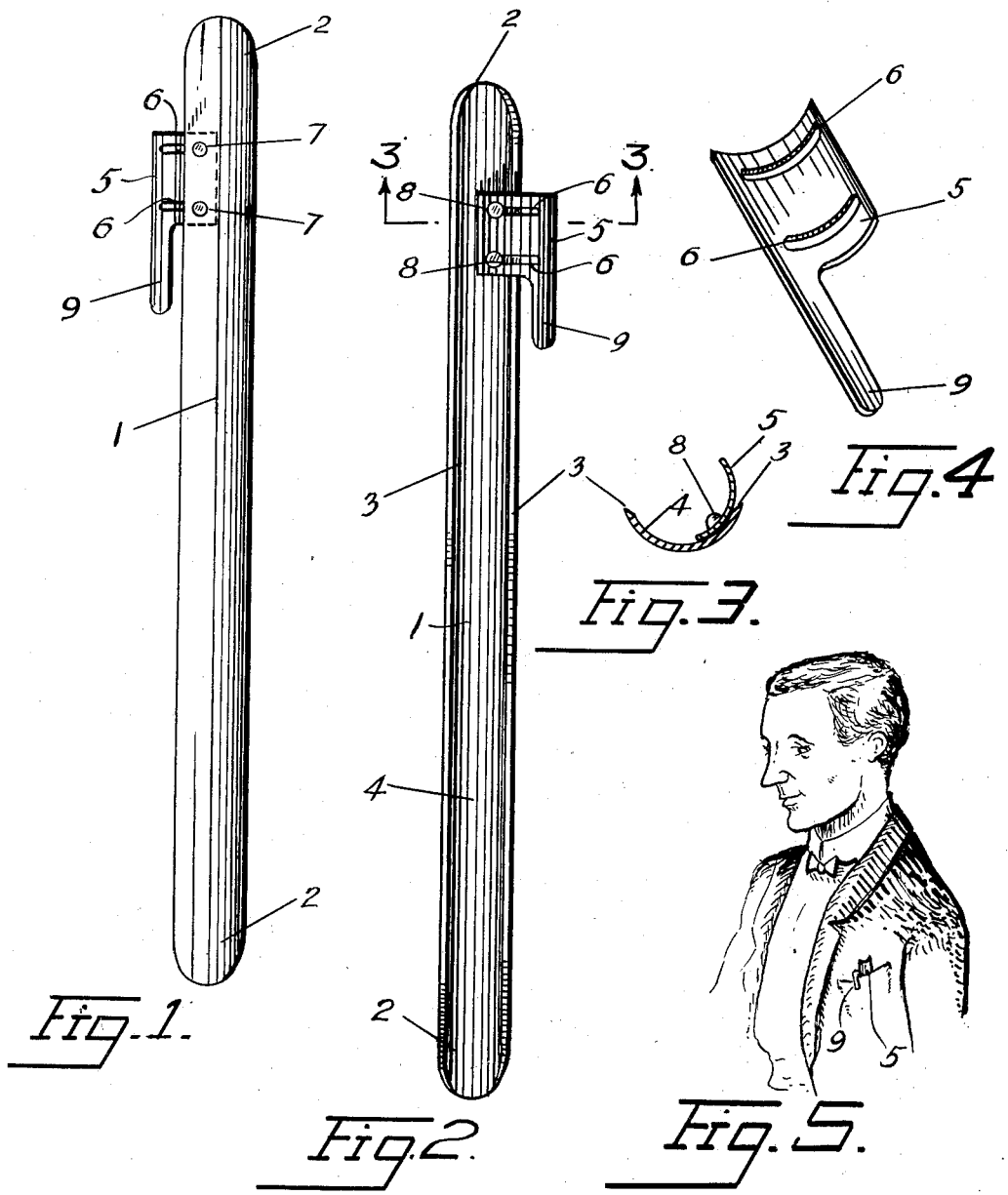
Figure 1 is a rear plan view of a scraper embodying this invention.
Figure 2 is a front view of Figure 1.
Figure 3 is a sectional view on line 3—3 of Figure 2.
Figure 4 is a detail in perspective of the finger member used in this invention, Figure 5 indicates the manner of holding the scraper in a person's pocket with the use of the finger member.

In the construction 1 represents the body of a scraper made from relatively thin material, bent to a circular arc of about 120 degrees. The end portions 2 are rounded to blunt points as indicated, and the edges 3 along the longitudinal sides are bevelled slightly on the inner surface 4 to scrape closely to the surface of the table. A finger element 5 consisting of a P-shaped piece with the slots 6 therein, and bent to conform with the inner surface of the body, is held adjacent one end by countersunk rivets 7 in the body material. The latter are headed over at 8 on the interior to hold the piece and yet allow its sliding movement from and in the body interior surface. When pulled out as shown in Figure 1, it is ready for handling, and by reason of the rounded leg 6 hanging over the side of the body, serves to make a hook that will engage on the open end portion of a pocket, and thereby hold the device thereto.

In use, the user holds the scaper by the piece just described and the projecting part, between his thumb and first and second fingers. He then drags and manipulates it across the table top causing the crumbs to enter into the concave interior and be held there. When the table has been cleared of crumbs, the scraper is brought to the dumping station, tipped up endwise and the crumbs deposited. After this, the operation is repeated as often as necessary. The end portions 2, serve to scoop into narrow places where the main scraper body could not enter, and the leg 9 serves to permit the thumb to twist it about and cover the table with a series of rotary movements. The scraper can be used across the area of operation with straight, curved, or rotary strokes, which cannot be accomplished by other conventional forms and the effort required is considerably less.

While but one form of the invention is shown in the drawing, and described in the appended specification, it is not desired to limit this application for patent to this particular construction, or in any other way, otherwise than limited by the prior art, as it is appreciated that other forms could be developed, that would use the same principles and come within the scope of the appended claims.

Having thus described the invention, what is claimed is:

1. A pocket crumb scraper comprising a single piece of transversely curved material of segmental section relatively narrow as compared with its longitudinal dimension for gathering crumbs on its concaved surface and adapted for insertion in a coat pocket, the end portions having a converging form for the facile dispensing of gathered crumbs from either end, and a member made from a single piece of material with a plurality of slots therein and a leg-like projection, adapted to clasp over the edge portion of a coat pocket, said member being transversely curved to fit within the first mentioned piece and be slidable transversely on its external convexed surface with the projection extending sidewise away from the side of the piece for finger manipulation of the scraper in straight or curved movements, and pins in the first mentioned piece for adjustably holding the member adjacent one end of the piece and for enabling the leg projection to form the pocket clasp for the scraper as well as a handle for finger holding and manipulation.

2. A pocket crumb scraper of the class described comprising in combination, a single piece of rigid material transversely bent into a limited segmental form relatively narrow as compared with its length for gathering crumbs into its concaved surface when its longitudinal edge is scraped on a table surface, the end portions of the piece being bluntly pointed for the facile dispensing of crumbs from the piece and its edge portions bevelled to provide a sharpened edge for the easy passage of the crumbs scraped therein thereby, and a member attached adjacent to one end portion of the said piece formed to fit and transversely slide over a portion of the concave portion of the said piece, said member having parallel transverse slots therein spaced over each other and a pending leg cut from the lower portion of the member and extending down from the same to form an overhanging element at the side of the said piece, pin means on the piece for engagement in the slots and to permit the adjustable movement of the member at one side of coat pocket and to provide a finger holding part for manipulating the piece to scrape up crumbs substantially as described.

JOHN HENRY MILLER.